United States Patent
Schmandt et al.

(10) Patent No.: US 6,729,444 B1
(45) Date of Patent: May 4, 2004

(54) DRUM-IN-HAT DISC BRAKE ASSEMBLY

(75) Inventors: Anthony Schmandt, Walled Lake, MI (US); Larry Stewart, Ypsilanti, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 10/094,314

(22) Filed: Mar. 8, 2002

(51) Int. Cl.$^7$ ................................................ F16D 65/00
(52) U.S. Cl. .................................. 188/73.1; 188/205 R
(58) Field of Search ............................ 188/73.1, 73.31, 188/73.32, 18 A, 70 R, 73.39, 78, 218 R, 218 XL, 205 R, 206 R

(56) References Cited

U.S. PATENT DOCUMENTS

| | | | |
|---|---|---|---|
| 3,949,839 A | 4/1976 | Girauldon | 188/73.3 |
| 4,031,986 A | 6/1977 | Thompson | 188/72.4 |
| 4,485,897 A | 12/1984 | Kawaguchi et al. | 188/73.39 |
| 4,705,145 A | 11/1987 | Goulart | 188/18 A |
| 4,854,423 A * | 8/1989 | Evans et al. | 188/70 R |
| 5,180,037 A | 1/1993 | Evans | 188/70 R |
| 5,529,149 A | 6/1996 | Johannesen et al. | 188/70 R |
| 5,590,742 A | 1/1997 | Gutelius | 188/70 R |
| 5,715,916 A | 2/1998 | Fanelli et al. | 188/106 A |
| 5,865,275 A | 2/1999 | Anger et al. | 188/18 A |
| 5,884,732 A | 3/1999 | Anger et al. | 188/73.39 |
| 5,921,354 A * | 7/1999 | Evans | 188/73.2 |
| 5,957,247 A | 9/1999 | Zylstra et al. | 188/78 |

FOREIGN PATENT DOCUMENTS

DE 3608986 9/1987

OTHER PUBLICATIONS

US patent application Publication US 2002/0046910 to Frouin.*

* cited by examiner

*Primary Examiner*—Matthew C. Graham
*Assistant Examiner*—Melody M. Burch
(74) *Attorney, Agent, or Firm*—MacMillan, Sobanski & Todd, LLC

(57) ABSTRACT

This invention relates to a drum-in-hat disc brake assembly. According to one embodiment of the invention, only four fasteners extend through the associated apertures of the backing plate, the drum-in-hat adapter, the axle flange and the caliper bracket for securing the caliper bracket, drum-in-hat adapter and the backing plate to the axle flange. Two of the four fasteners extend through the two apertures of the caliper bracket and at least partially into two of the four apertures of the axle flange to thereby secure the caliper bracket to the axle flange. The other two of the four fasteners extend through the two smaller apertures of the backing plate and the drum-in-hat adapter and at least partially into the remaining two apertures of the axle flange to thereby secure the backing plate and the drum-in-hat adapter to the axle flange.

19 Claims, 4 Drawing Sheets

DRUM-IN-HAT DISC BRAKE ASSEMBLY

BACKGROUND OF THE INVENTION

This invention relates in general to vehicle brake assemblies and in particular to an improved structure for mounting a vehicle drum-in-hat type of disc brake assembly to the vehicle.

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. In some instances, the disc brake assembly can be a "drum-in-hat" type of disc brake assembly. The brake assemblies are actuated by hydraulic or pneumatic pressure generated when an operator of the vehicle depresses a brake pedal. The structures of these drum brake assemblies and disc brake assemblies, as well as the actuators therefor, are well known in the art.

A typical drum-in-hat type of disc brake assembly includes a hydraulically or pneumatically actuated disc service brake and a mechanically actuated drum-in-hat parking and emergency brake. The disc service brake includes a rotor which is secured to the wheel of the vehicle for rotation therewith. The rotor includes a pair of opposed friction plates which are selectively engaged by portions of a caliper assembly. The interior of the rotor defines an cylindrical braking surface.

A caliper assembly is slidably supported by pins secured to a mounting flange. The mounting flange is secured to a non-rotatable component of the vehicle, such as the steering knuckle or the axle flange. To accomplish this, typically two threaded bolts extend through the mounting flange and are received in threaded apertures provided in the non-rotatable vehicle component to thereby secure the mounting flange to the non-rotatable vehicle component. The caliper assembly includes a pair of brake shoes which are disposed on opposite sides of the rotor. The brake shoes are operatively connected to one or more hydraulically actuated pistons for movement between a non-braking position, wherein they are spaced apart from the opposed friction plates of the rotor, and a braking position, wherein they are moved into frictional engagement with the opposed friction plates of the rotor. When the operator of the vehicle depresses the brake pedal, the piston urges the brake shoes from the non-braking position to the braking position so as to frictionally engage the friction plates of the rotor and thereby slow or stop the rotation of the associated wheel of the vehicle.

The drum-in-hat parking and emergency brake includes a pair of opposed arcuate brake shoes which are supported on a backing plate for selective movement relative thereto. The backing plate is secured to the mounting flange, or alternatively, can be formed integral therewith. To accomplish this in the case of the former type of structure, typically four threaded bolts extend through the backing plate and through openings provided in the mounting flange and nuts installed thereon to secure the backing plate to the mounting flange. Each of the brake shoes has a friction pad or lining secured thereto. The brake shoes extend within the cylindrical braking surface of the rotor. To effect parking and emergency braking action, the operator of the vehicle manually pulls an actuating lever. The lever is connected to an actuation cable having a park brake cable end which, when pulled, actuates a mechanical actuating mechanism. The actuating mechanism is located adjacent one of the ends of the brake shoes and is operative to move the brake shoes outwardly apart from one another such that the friction pads frictionally engage the cylindrical braking surface of the rotor. Such frictional engagement causes slowing or stopping of the rotational movement of the rotor and, therefore, the wheel of the vehicle in a controlled manner.

SUMMARY OF THE INVENTION

This invention relates to an improved structure for mounting a vehicle drum-in-hat type of disc brake assembly to the vehicle. The drum-in-hat disc brake assembly includes a backing plate adapted to support a drum brake shoe assembly of the drum-in-hat parking and emergency brake, a drum-in-hat adapter, an axle flange, and a caliper bracket adapted support a disc brake caliper assembly of the disc service brake. According to one embodiment of the invention, the backing plate has a centrally located aperture and at least two smaller mounting apertures formed therein about the centrally located aperture thereof. The drum-in-hat adapter has a centrally located aperture and at least two smaller mounting apertures formed therein about the centrally located aperture thereof. The axle flange has a centrally located aperture and at least four mounting apertures formed therein about the centrally located aperture. And the caliper bracket has at least two apertures formed therein. In this embodiment, only four fasteners extend through the associated apertures of the backing plate, the drum-in-hat adapter, the axle flange and the caliper bracket for securing the caliper bracket, drum-in-hat adapter and the backing plate to the axle flange. Two of the four fasteners extend through the two apertures of the caliper bracket and at least partially into two of the four apertures of the axle flange to thereby secure the caliper bracket to the axle flange. The other two of the four fasteners extend through the two smaller apertures of the backing plate and the drum-in-hat adapter and at least partially into the remaining two apertures of the axle flange to thereby secure the backing plate and the drum-in-hat adapter to the axle flange.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
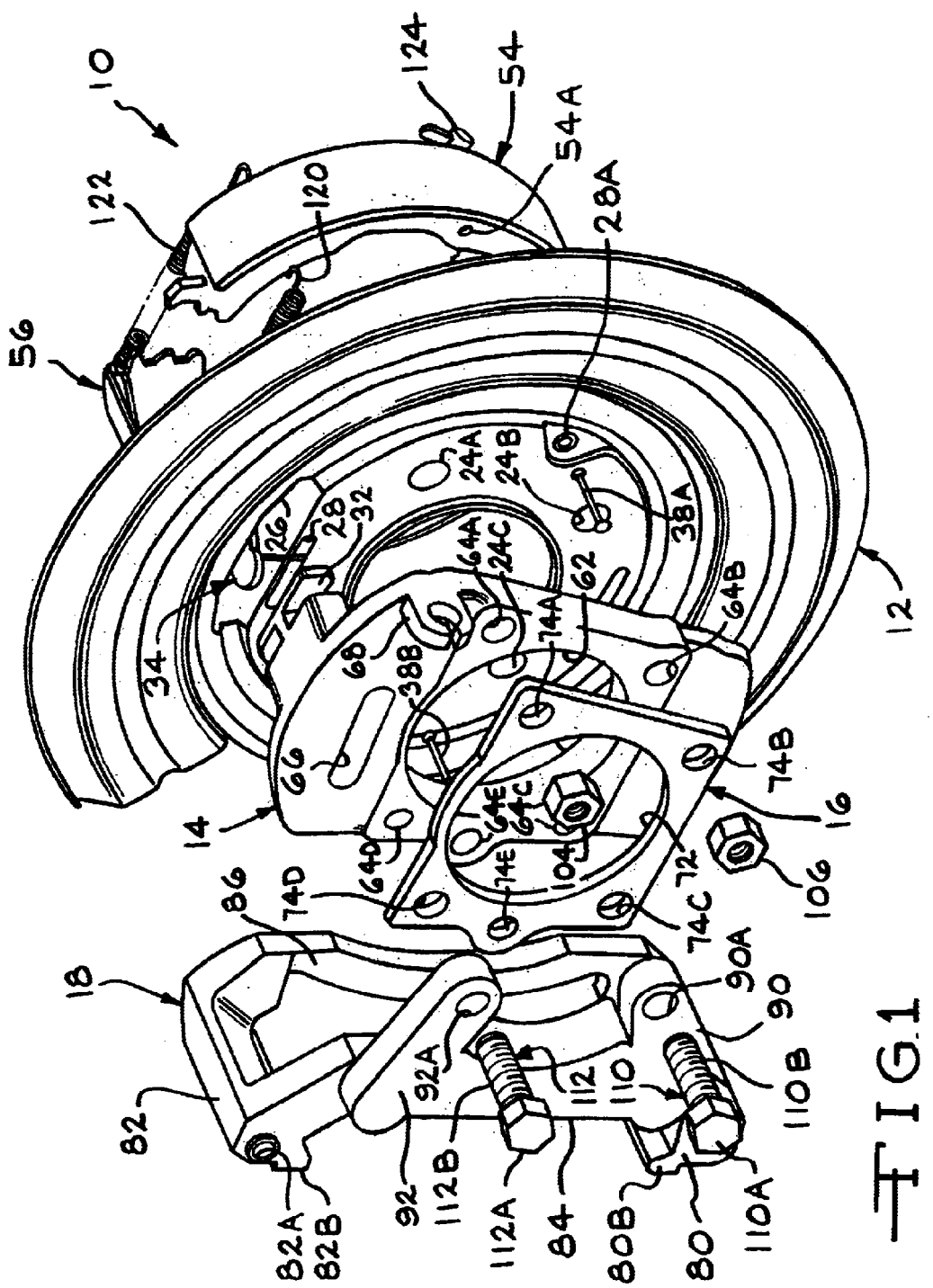
FIG. 1 is an exploded perspective view of a first embodiment of a drum-in-hat disc brake assembly in accordance with the present invention.
Figure 2:
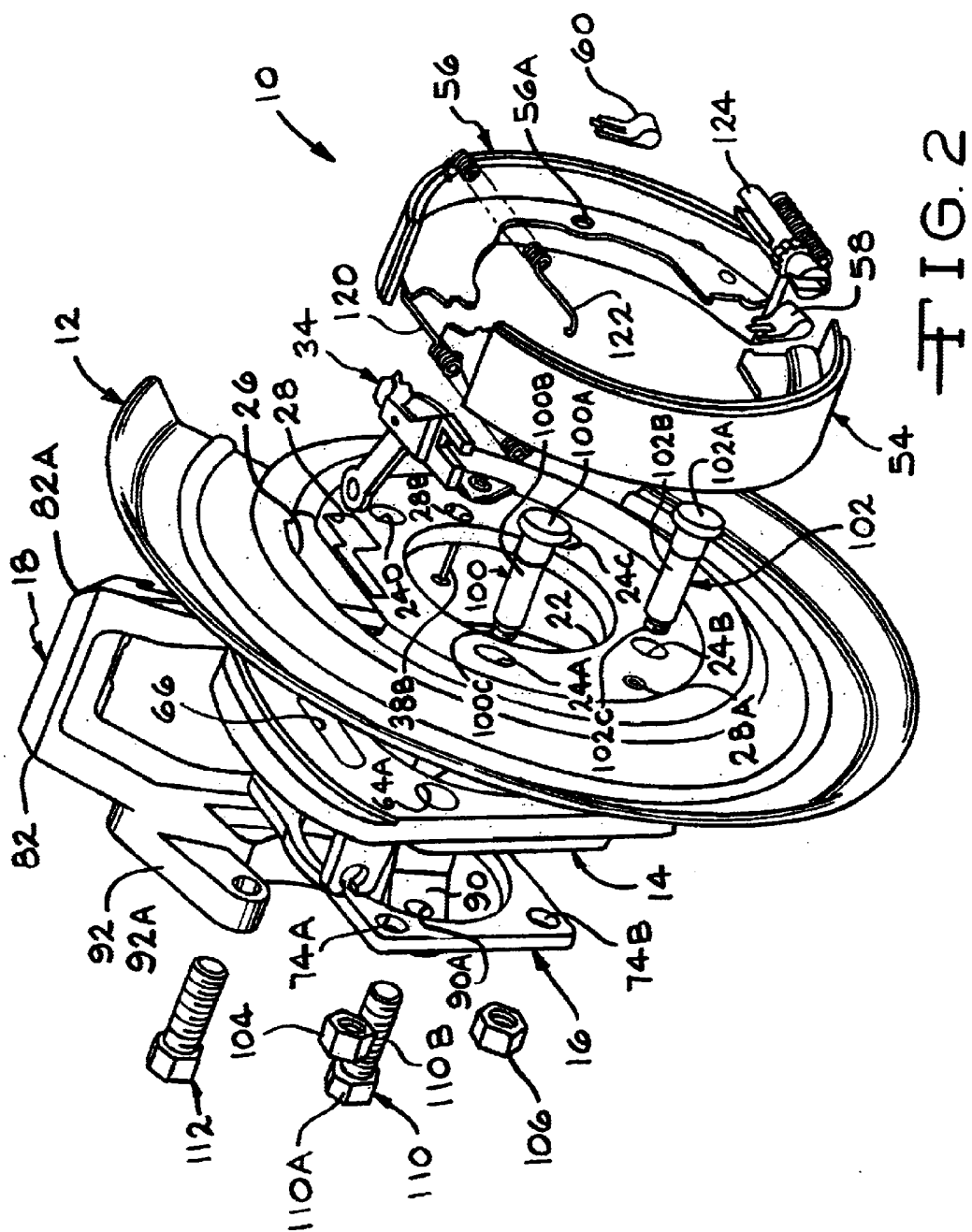
FIG. 2 is a another exploded perspective view of the drum-in-hat disc brake assembly illustrated in FIG. 1 in accordance with the present invention.

Referring now to the drawings, there is illustrated in FIGS. 1 and 2 a portion of a drum-in-hat type of disc brake assembly, indicated generally at 10, in accordance with the present invention. The drum-in-hat disc brake assembly 10 includes a hydraulically or pneumatically actuated disc service brake (not shown), and a drum-in-hat parking and emergency brake. The general structure and operation of the drum-in-hat disc brake assembly 10 is conventional in the art. Thus, only those portions of the drum-in-hat disc brake assembly 10 which are necessary for a full understanding of this invention will be explained and illustrated in detail. Although this invention will be described and illustrated in conjunction with the particular vehicle drum-in-hat disc brake assembly 10 disclosed herein, it will be appreciated that this invention may be used in conjunction with other drum-in-hat disc brake assemblies.

The illustrated drum-in-hat disc brake assembly 10 includes a backing plate 12, a drum-in-hat adapter 14, an axle flange 16 and a caliper bracket 18. The backing plate 12 is preferably a stamped metal backing plate and includes a relatively large central opening 22 and a plurality of smaller holes 24A–24D formed therein about the central opening 22. In the illustrated embodiment, the backing plate 12 is provided with four such smaller holes 24A–24D. As will be discussed below, the central opening 22 permits an outer end of a rotatable axle (not shown) to extend therethrough to a wheel (not shown) of the vehicle. Alternatively, the structure of the backing plate 12 can be other than illustrated if so desired. For example, the two apertures 24A and 24B could be replaced with a single aperture, shown in phantom in FIG. 4 by reference character 24F, preferably located generally intermediate the two disclosed apertures 24A and 24B.

In the illustrated embodiment, the backing plate 12 also includes a generally elongated, slotted first opening 26, a generally elongated, slotted opening 28, and two smaller openings 30A and 30B formed therein. The first slotted opening 26 is adapted to allow an abutment member 32 of the drum-in-hat adapter 14 to extend therethrough. The second opening 28 is adapted to allow an actuator 34 of the parking and emergency brake to extend therethrough. Pins 38A and 38B of conventional pivot pin and spring-clip assemblies extend through the openings 28A and 28B, respectively, of the backing plate 12 and through associated openings 54A and 56A provided in a pair of brake shoes 54 and 56, respectively. The pins 38A and 38B have outer ends which are adapted to be fastened or secured to clips 58 and 60 assemblies to secure the brake shoes 54 and 56 to the backing plate 12 in a conventional manner. The illustrated drum-in-hat brake assembly 10 also includes a pair of retraction springs 120 and 122 and a pad wear adjuster mechanism 124, all of which are conventional in the art. Alternatively, the construction of the drum-in-hat brake assembly 10 can be other than illustrated if so desired. Alternatively, the construction of the drum-in-hat brake assembly 10 can be other than illustrated if so desired.

The drum-in-hat adapter 14 is preferably formed from cast iron and includes a relatively large central opening 62 and a plurality of smaller holes 64A–64E formed therein about the central opening 62. In the illustrated embodiment, the adapter 14 is provided with five such smaller holes 64A–64E. The holes 64A–64D of the adapter 14 are formed to be in alignment with the holes 24A–24D, respectively, of the backing plate 12 for a purpose to be discussed below. As will be discussed below, in the illustrated embodiment the apertures 64C and 64D of the drum-in-hat adapter 14 are preferably threaded apertures.

Figure 3:
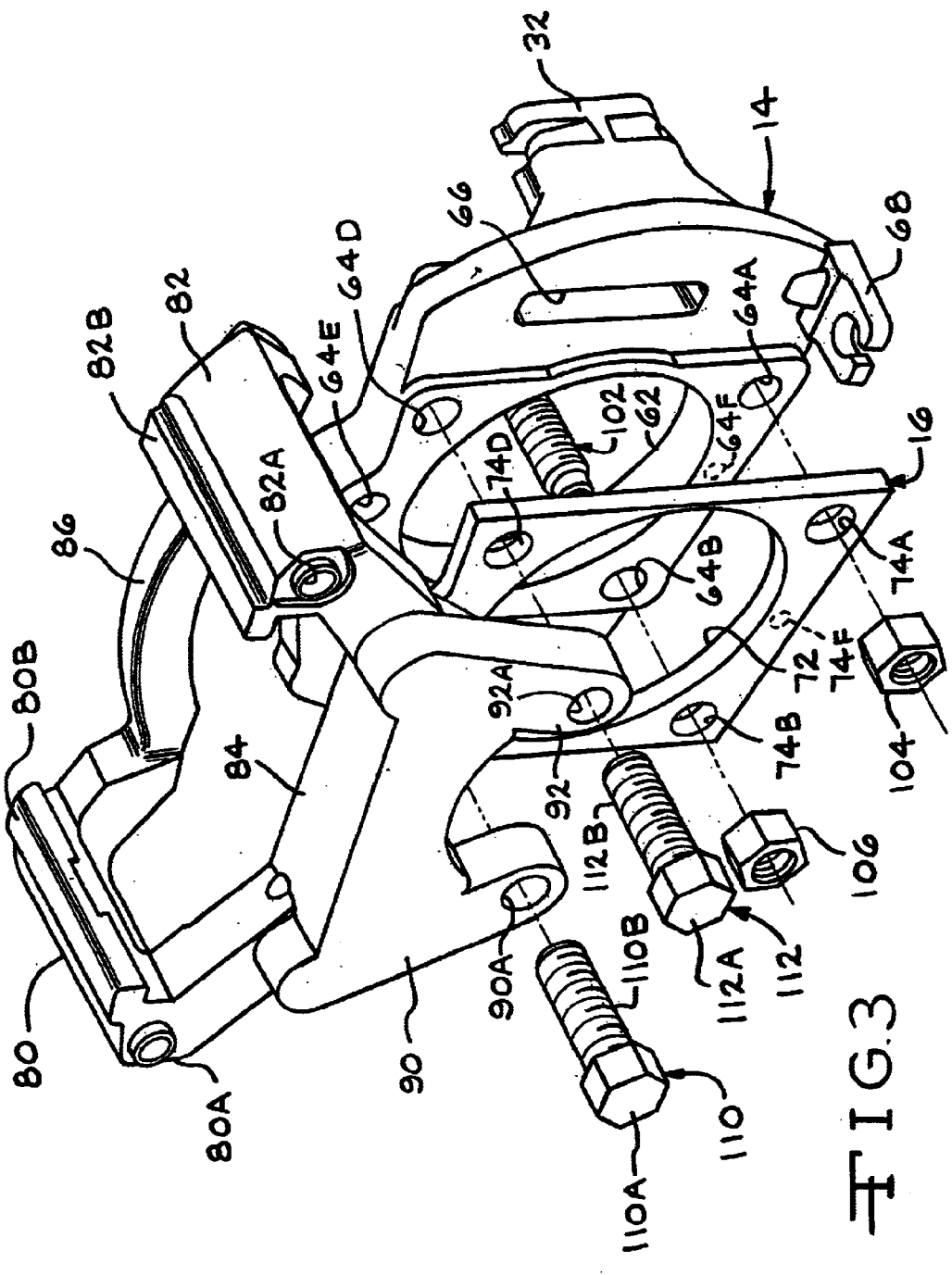
FIG. 3 is an exploded perspective view of a selected portion of the drum-in-hat disc brake assembly illustrated in FIGS. 1 and 2 in accordance with the present invention.

In the illustrated embodiment, the adapter 14 also includes a generally elongated, slotted opening 66, and a cable attaching flange 68. The elongated slotting opening 66 is adapted to allow a lever of the actuator 34 to pass therethrough. The cable attaching flange 68 is adapted to support a cable portion (not shown) of the parking and emergency brake cable assembly. Alternatively, the structure of the drum-in-hat adapter 14 can be other than illustrated if so desired. For example, depending upon the structure of the backing plate 12, the two apertures 64A and 64B could be replaced with a single aperture, such as shown in phantom in FIG. 3 by reference character 64F, preferably located generally intermediate therebetween.

The axle flange 16 is preferably a metal forging or stamping and includes a relatively large central opening 72 and a plurality of smaller holes 74A–74E formed therein about the central opening 72. In the illustrated embodiment, the axle flange 16 is provided with five such smaller holes 74A–74E. The holes 74A–74E of the axle flange 16 are formed to be in alignment with the holes 64A–64E, respectively, of the adapter 14 for a purpose to be discussed below. Also, in the illustrated embodiment, the two apertures 74C and 74D are preferably non-threaded or through apertures for a purpose to be discussed below. Alternatively, the structure of the axle flange 16 can be other than illustrated if so desired. For example, depending upon the structure of the drum-in-hat adapter 14 and the backing plate 12, the two apertures 74C and 74D could be replaced with a single threaded or non-threaded aperture (not shown) located generally intermediate therebetween. In this case, it may be necessary to provide some other type of structure/means to restrain or prevent the rotation of the attached caliper bracket 18. For example, a suitable structure/means to accomplish this could be a small type of fastener, such as a self-tapping screw, or could be a non-fastener device, such as an extension or protuberance provided on one component which is adapted to be received into a recess provided on another component. Also, the two apertures 74A and 74B could be replaced with a single aperture, such as shown in phantom in FIG. 3 by reference character 74F, preferably located generally intermediate therebetween. In the illustrated embodiment, the holes 64E of the drum-in-hat adapter 14 and 74E of the axle flange 16 are adapted to receive a speed sensor (not shown) of a vehicle anti-lock brake system. Alternatively, the apertures 64E and 74E could be eliminated if a speed sensor is not part of the brake assembly.

Figure 4:
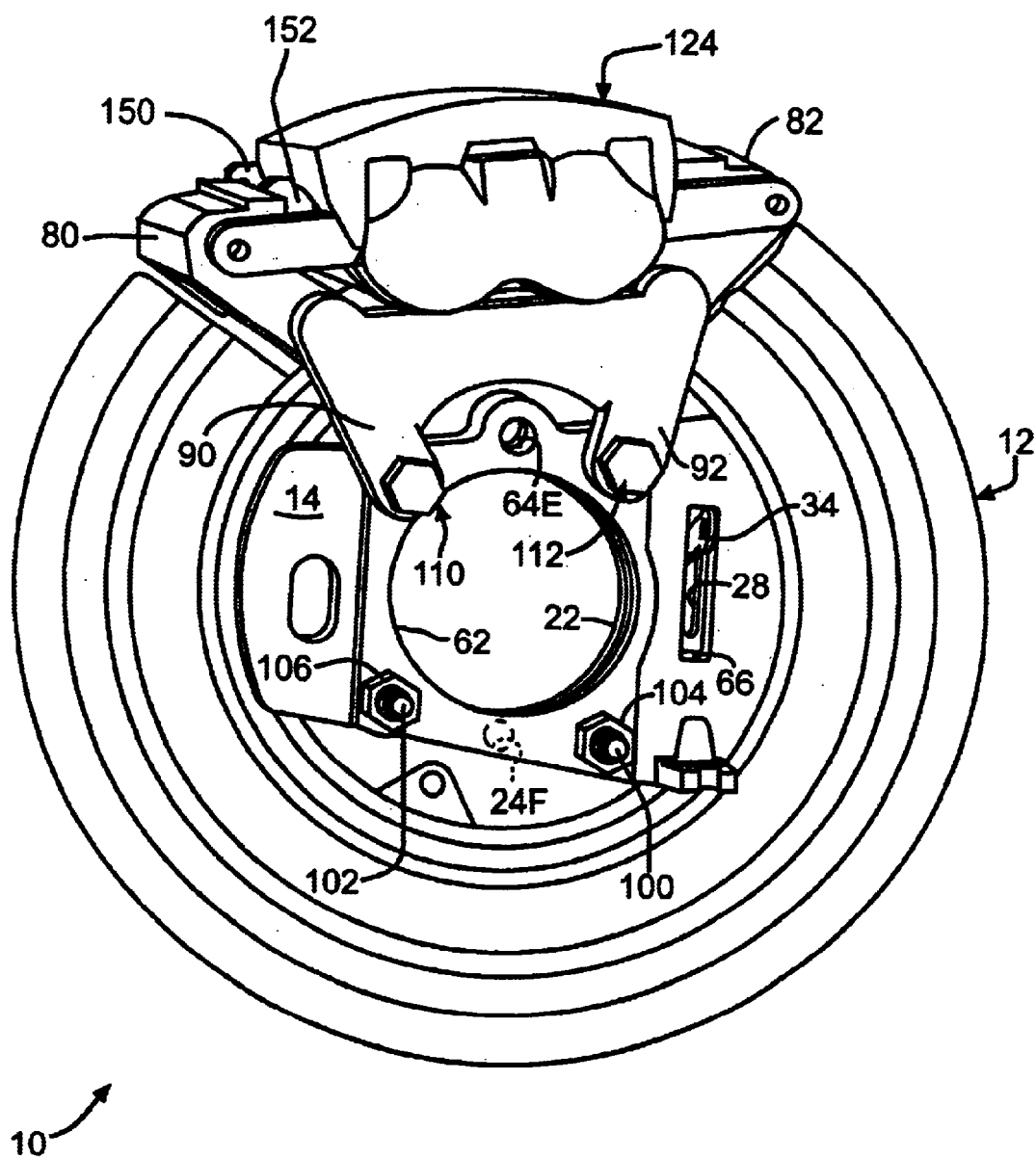
FIG. 4 is an outboard view of the assembled components of the drum-in-hat disc brake assembly illustrated in FIGS. 1–3 in accordance with the present invention.

As best shown in FIG. 2, the caliper bracket 18 includes a pair of axially and outwardly extending arms 80 and 82 which are interconnected at their inboard ends by an inner tie bar 84 and at their outboard ends by an outer tie bar 86. The arms 80 and 82 have respective apertures 80A and 82A formed therein, and respective upstanding guide rails 80B and 82B formed thereon. The guide rails 80B and 82B extend transverse to the arms 80 and 82, respectively, and parallel to one another. The guide rails 80B and 82B slidably a pair of brake shoes 150 and 152 thereon, as shown in FIG. 4. The apertures 80A and 82A are adapted to receive suitable fasteners to slidably or fixedly secure a disc brake caliper 124, shown in FIG. 4, of the disc service brake to the caliper bracket 22.

The caliper bracket 22 further includes a pair of mounting legs or extensions 90 and 92. In the illustrated embodiment, the legs 90 and 92 extend from the inner tie bar 84. The mounting leg 90 includes an aperture 90A formed therethrough, and the mounting leg 92 includes an aperture 92A formed therethrough. In the illustrated embodiment, the apertures 90A and 92A are non-threaded apertures. Alternatively, the structure of the caliper bracket 22 including the apertures 90A and 92A can be other than illustrated if so desired.

In the illustrated embodiment, the components of the drum-in-hat brake assembly 10 are secured to the axle flange 16 in the following manner. A pair of threaded bolts 100 and 102 and nuts 104 and 106 are used to secure the backing plate 12 and the drum-in-hat adapter 14 to the axle flange 16. The bolt 100 includes an enlarged head 100A, a main body 100B having a serrated portion adjacent the head 100A, and a threaded end 100C. The bolt 100 extends through the aperture 24A of the backing plate 12, the aperture 64A of the drum-in-hat adapter 14, and the aperture 74A of the axle flange 16. The nut 104 is then installed on the threaded end 100C of the bolt 100. Alternatively, the structure of the bolt 100 can be other than illustrated and described if so desired. For example, the serrations on the main body 100B of the bolt 100 could be eliminated.

Similarly, the bolt 102 includes an enlarged head 1002A, a main body 102B having a serrated portion adjacent the head 102A, and a threaded end 102C. The bolt 102 extends through the aperture 24B of the backing plate 12, the aperture 64B of the drum-in-hat adapter 14, and the aperture 74b of the axle flange 16. The nut 106 is then installed on the threaded end 102C of the bolt 102. Alternatively, the backing plate 12 and the drum-in-hat adapter 14 can be secured to the axle flange 16 by other methods if so desired. For example, the nuts 104 and 106 could be eliminated and the apertures 74A and 74B in the axle flange 16 could be threaded to receive the respective threaded ends 100C and 102C of the bolts 100 and 102. Also, instead of using the two bolts 100 and 102, only a single bolt (not shown) could be used to secure the backing plate 12 and the drum-in-hat adapter 14 to the axle flange 16 in the ways discussed above. In addition, depending upon the particular vehicle design, one or more smaller self-tapping type screws (not shown) could be used to secure the backing plate 12 to the drum-in-hat adapter 14, preferably in the region near the holes 24C and 24D of the backing plate 12.

In the illustrated embodiment, a pair of threaded bolts 110 and 112 are provided to secure the caliper bracket 18 to the axle flange 16 and the drum-in-hat adapter 14. The bolt 110 includes a hex-shaped head 100A and a threaded body 100B. The bolt 110 extends through the aperture 90A of the caliper bracket 18, through the aperture 74C of the axle flange 16 and threadably received in the threaded aperture 64C of the drum-in-hat adapter 14.

Similarly, the bolt 112 includes a hex-shaped head 112A and a threaded body 112B. The bolt 112 extends through the aperture 92A of the caliper bracket, through the aperture 74D of the axle flange 16 and is threadably received in the aperture 64D of the drum-in-hat adapter 14. Alternatively, the structure of the bolt 110 and 112 can be other than illustrated and described if so desired. For example, the bolts 110 and 112 could be an internal drive type fastener, such as a TORX® fastener.

Also, the caliper bracket 18 can be secured to the drum-in-hat adapter 14 by other methods if so desired. For example, the apertures 64C and 64D of the drum-in-hat adapter 14 could be through holes and the bolts 110 and 112 could extend through the holes 90A and 92A of the caliper bracket 18, through the holes 74C and 74D of the axle flange, and through the holes 64C and 64D of the adapter 14 and nuts installed thereon. These nuts could be supplied loose or could be welded or otherwise attached to the outboard side of the drum-in-hat adapter 14.

In addition, the caliper bracket 18 can be secured to the axle flange 16 or to the axle flange, the drum-in-hat adapter 14 and the backing plate 12 by other methods if so desired. For example, to secure the caliper bracket 18 to the axle flange 16, the apertures 74C and 74D of the axle flange 16 could be threaded 5 apertures. In this case, the bolts 110 and 112 extend through the apertures 90A and 92A of the caliper bracket 18 and are threadably received in the respective threaded apertures 74C and 74D of the axle flange 16 to secure the caliper bracket 18 to the axle flange 16. To secure the caliper bracket 18 to the axle flange 16, the drum-in-hat adapter 14 and the backing plate 12, the apertures 74C and 74D of the axle flange 16 could be through holes and the apertures 64C and 64D of the drum-in-hat adapter 14 could also be through holes to enable the threaded ends 110B and 112B of the bolts 110 and 112, respectively, to extend therethrough and nuts (not shown) installed thereon to secure the caliper bracket 18 to the axle flange 16, the drum-in-hat adapter 14 and the backing plate 12. Also, instead of using two bolts 110 and 112, only a single bolt (not shown) could be used to secure the caliper bracket 18 to the axle flange 16 or to the axle flange 16 and other selected components of the drum-in-hat disc brake assembly 10 in the ways discussed above if so desired.

Although the present invention has been illustrated and described in conjunction with the particular drum-in-hat disc brake assembly disclosed herein, it will be appreciated that this invention can be used in conjunction with other drum and disc brake assemblies.

In accordance with the provisions of the patent statutes, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A drum-in-hat disc brake assembly having a disc service brake and a drum-in-hat parking and emergency brake, the drum-in-hat disc brake assembly comprising:

a backing plate adapted to support a drum brake shoe assembly of the drum-in-hat parking and emergency brake, the backing plate having a centrally located opening and at least two smaller mounting apertures formed therein about the centrally located opening thereof;

a drum-in-hat adapter having a centrally located opening and at least two smaller mounting apertures formed therein about the centrally located opening thereof;

an axle flange having a centrally located opening and at least four mounting apertures formed therein about the centrally located opening thereof, the axle flange adapted to be secured to an axle tube which in turn is adapted to extend through the centrally located openings of the backing plate, the drum-in-hat adapter and the axle flange; and a caliper bracket adapted to support a disc brake caliper assembly of the disc service brake, the caliper bracket having at least two apertures formed therein;

wherein a plurality of fasteners are provided and extend through the respective apertures of the backing plate, the drum-in-hat adapter, the axle flange and the caliper bracket for securing the caliper bracket, drum-in-hat adapter and the backing plate to the axle flange, said plurality of fasteners consisting of only four fasteners, two of the four fasteners extending through the at least two apertures of the caliper bracket and at least partially into two of the at least four mounting apertures of the axle flange to thereby secure the caliper bracket to the axle flange, and the other two of the four fasteners extending through two smaller apertures of the backing plate and the drum-in-hat adapter and at least partially into the remaining two apertures of the axle flange to thereby secure the backing plate and the drum-in-hat adapter to the axle flange.

2. The drum-in-hat disc brake assembly according to claim 1 wherein at least two of the at least four apertures of the axle flange are threaded, and the two fasteners which extend through the two apertures of the caliper bracket have threaded ends which are threadably received in the at least two threaded apertures of the axle flange to thereby secure the caliper bracket to the axle flange.

3. The drum-in-hat disc brake assembly according to claim 1 wherein at least two of the at least four apertures of the axle flange are non-threaded and the drum-in-hat adapter includes two additional apertures which are threaded apertures, and the two fasteners which extend through the two apertures of the caliper bracket extend through the at least two non-threaded apertures of the axle flange and have threaded ends which are threadably received in the two additional threaded apertures of the drum-in-hat adapter to thereby secure the caliper bracket to the axle flange and the drum-in-hat adapter.

4. The drum-in-hat disc brake assembly according to claim 1 wherein at least two of the at least four apertures of the axle flange are non-threaded and the drum-in-hat adapter includes two additional apertures which are non-threaded apertures, and the two fasteners which extend through the two apertures of the caliper bracket extend through the at least two non-threaded apertures of the axle flange and through the two additional non-threaded apertures of the drum-in-hat adapter and wherein nuts are installed on the threaded ends of the fasteners to thereby secure the caliper bracket to the axle flange and the drum-in-hat adapter.

5. The drum-in-hat disc brake assembly according to claim 1 wherein the backing plate includes two additional apertures formed therein, the drum-in-hat adapter includes two additional apertures which are non-threaded apertures, and at least two of the at least four apertures of the axle flange are non-threaded, and the two fasteners which extend through the two apertures of the caliper bracket extend through the at least two non-threaded apertures of the axle flange, through the two additional non-threaded apertures of the drum-in-hat adapter and through the two additional apertures of the backing plate and wherein nuts are installed on the threaded ends of the fasteners to thereby secure the caliper bracket to the axle flange, the drum-in-hat adapter, and the backing plate.

6. The drum-in-hat disc brake assembly according to claim 1 wherein the remaining two of the at least four apertures of the axle flange are non-threaded, and the other two fasteners extend through the two smaller apertures of the backing plate and the drum-in-hat adapter and through the remaining two non-threaded apertures of the axle flange and have nuts installed thereon to thereby secure the backing plate and the drum-in-hat adapter to the axle flange.

7. The drum-in-hat disc brake assembly according to claim 1 wherein the remaining two of the at least four apertures of the axle flange are threaded, and the other two fasteners which extend through the two smaller apertures of the backing plate and the drum-in-hat adapter have threaded ends which are threadably received in the remaining two threaded apertures of the axle flange to thereby secure backing plate and the drum-in-hat adapter to the axle flange.

8. The drum-in-hat disc brake assembly according to claim 1 wherein the caliper bracket includes a pair of arms interconnected at their inboard ends by an inner tie bar and at their outboard ends by an outer tie bar.

9. The drum-in-hat disc brake assembly according to claim 8 wherein the caliper bracket further includes a pair of mounting legs extending from the inner tie bar, and wherein the at least two apertures formed in the caliper bracket are formed in the mounting legs.

10. A drum-in-hat disc brake assembly having a disc service brake and a drum-in-hat parking and emergency brake, the drum-in-hat disc brake assembly comprising:

a backing plate adapted to support a drum brake shoe assembly of the drum-in-hat parking and emergency brake, the backing plate having a centrally located opening and at least one smaller mounting aperture formed therein about the centrally located opening thereof;

a drum-in-hat adapter having a centrally located opening and at least one smaller mounting aperture formed therein about the centrally located opening thereof;

an axle flange having a centrally located opening and at least three mounting apertures formed therein about the centrally located opening thereof, the axle flange adapted to be secured to an axle tube which in turn is adapted to extend through the centrally located openings of the backing plate, the drum-in-hat adapter and the axle flange; and a caliper bracket adapted to support a disc brake caliper assembly of the disc service brake, the caliper bracket having at least two apertures formed therein;

wherein a plurality of fasteners are provided and extend through the respective apertures of the backing plate, the drum-in-hat adapter, the axle flange and the caliper bracket for securing the caliper bracket, drum-in-hat adapter and the backing plate to the axle flange, said plurality of fasteners consisting of only three fasteners, two of the three fasteners extending through the at least two apertures of the caliper bracket and at least partially into two of the at least three mounting apertures of the axle flange to thereby secure the caliper bracket to the axle flange, and the other one of the three fasteners extending through one smaller aperture of the backing plate and the drum-in-hat adapter and at least partially into the remaining one aperture of the axle flange to thereby secure the backing plate and the drum-in-hat adapter to the axle flange.

11. The drum-in-hat disc brake assembly according to claim 10 wherein at least two of the at least three apertures of the axle flange are threaded, and the two fasteners which extend through the two apertures of the caliper bracket have threaded ends which are threadably received in the at least two threaded apertures of the axle flange to thereby secure the caliper bracket to the axle flange.

12. The drum-in-hat disc brake assembly according to claim 10 wherein at least two of the at least three apertures of the axle flange are non-threaded and the drum-in-hat adapter includes two additional apertures which are threaded apertures, and the two fasteners which extend through the two non-threaded apertures of the caliper bracket extend through the at least two non-threaded apertures of the axle flange and have threaded ends which are threadably received in the two additional threaded apertures of the drum-in-hat adapter to thereby secure the caliper bracket to the axle flange and the drum-in-hat adapter.

13. The drum-in-hat disc brake assembly according to claim 10 wherein at least two of the at least three apertures of the axle flange are non-threaded and the drum-in-hat adapter includes two additional apertures which are non-threaded apertures, and the two fasteners which extend through the two non-threaded apertures of the caliper bracket extend through the at least two non-threaded apertures of the axle flange and through the two additional non-threaded apertures of the drum-in-hat adapter and wherein nuts are installed on the threaded ends of the fasteners to thereby secure the caliper bracket to the axle flange and the drum-in-hat adapter.

14. The drum-in-hat disc brake assembly according to claim 10 wherein the backing plate includes two additional apertures formed therein, the drum-in-hat adapter includes two additional apertures which are non-threaded apertures, and at least two of the at least three apertures of the axle flange are non-threaded, and the two fasteners which extend through the two apertures of the caliper bracket extend through the at least two non-threaded apertures of the axle flange, through the two additional non-threaded apertures of the drum-in-hat adapter and through the two additional apertures of the backing plate and wherein nuts are installed on the threaded ends of the fasteners to thereby secure the caliper bracket to the axle flange, the drum-in-hat adapter, and the backing plate.

15. The drum-in-hat disc brake assembly according to claim 10 wherein the remaining one of the at least three apertures of the axle flange is non-threaded, and the other one fastener extends through the smaller apertures of the backing plate and the drum-in-hat adapter and through the remaining one non-threaded aperture of the axle flange and has a nut is installed thereon to thereby secure the backing plate and the drum-in-hat adapter to the axle flange.

16. The drum-in-hat disc brake assembly according to claim 10 wherein the remaining one of the at least three apertures of the axle flange is threaded, and the other one fastener which extends through the smaller apertures of the backing plate and the drum-in-hat adapter has a threaded end which is threadably received in the remaining one threaded aperture of the axle flange to thereby secure backing plate and the drum-in-hat adapter to the axle flange.

17. The drum-in-hat disc brake assembly according to claim 10 wherein the caliper bracket includes a pair of arms interconnected at their inboard ends by an inner tie bar and at their outboard ends by an outer tie bar.

18. The drum-in-hat disc brake assembly according to claim 17 wherein the caliper bracket further includes a pair of mounting legs extending from the inner tie bar, and wherein the at least two apertures formed in the caliper bracket are formed in the mounting legs.

19. A drum-in-hat disc brake assembly having a disc service brake and a drum-in-hat parking and emergency brake, the drum-in-hat disc brake assembly comprising:

a backing plate adapted to support a drum brake shoe assembly of the drum-in-hat parking and emergency brake, the backing plate having a centrally located opening and at least two smaller mounting apertures formed therein about the centrally located opening thereof;

a drum-in-hat adapter having a centrally located opening and at least two smaller mounting apertures formed therein about the centrally located opening thereof;

an axle flange having a centrally located opening and at least four mounting apertures formed therein about the centrally located opening thereof, the axle flange adapted to be secured to an axle tube which in turn is adapted to extend through the centrally located openings of the backing plate, the drum-in-hat adapter and the axle flange; and a caliper bracket adapted to support a disc brake caliper assembly of the disc service brake, the caliper bracket including a pair of arms interconnected at their inboard ends by an inner tie bar and at their outboard ends by an outer tie bar, and a pair of mounting legs extending from the inner tie bar, the caliper bracket having at least two apertures formed therein;

wherein a plurality of fasteners are provided and extend through the respective apertures of the backing plate, the drum-in-hat adapter, the axle flange and the caliper bracket for securing the caliper bracket, drum-in-hat adapter and the backing plate to the axle flange, said plurality of fasteners consisting of only four fasteners, two of the four fasteners extending through the at least two apertures of the caliper bracket and at least partially into two of the at least four mounting apertures of the axle flange to thereby secure the caliper bracket to the axle flange, and the other two of the four fasteners extending through two smaller apertures of the backing plate and the drum-in-hat adapter and at least partially into the remaining two apertures of the axle flange to thereby secure the backing plate and the drum-in-hat adapter to the axle flange.

* * * * *